US007668634B2

(12) United States Patent
Mansell et al.

(10) Patent No.: US 7,668,634 B2
(45) Date of Patent: Feb. 23, 2010

(54) PERSONAL MOBILITY VEHICLE CONTROL SYSTEM WITH INPUT FUNCTIONS PROGRAMMABLY MAPPED TO OUTPUT FUNCTIONS

(76) Inventors: Wayne T. Mansell, 12A Thorns Road, Brierly Hill, Stourbridge, West Midlands, DY5 2JT (GB); Mark E. Greig, 1001 Wolfe Creek Dr., Longmont, CO (US) 80501; Peter J. Tasker, 7 Harley Way, Bridgworth, Shropshire WV1 65PA (GB)

( * ) Notice: Subject to any disclaimer, the term of this patent is extended or adjusted under 35 U.S.C. 154(b) by 201 days.

(21) Appl. No.: 11/417,459

(22) Filed: May 3, 2006

(65) Prior Publication Data

US 2006/0247836 A1 Nov. 2, 2006

Related U.S. Application Data

(63) Continuation of application No. 10/691,477, filed on Oct. 22, 2003, now Pat. No. 7,113,854.

(51) Int. Cl.
*G06F 7/00* (2006.01)

(52) U.S. Cl. ........................................ 701/36; 340/441

(58) Field of Classification Search .................. 701/22, 701/36; 307/9.1; 280/250.1, 304.1; 297/DIG. 4; 323/282; 180/65.1, 7.1, 907, 6.5; 340/384.5, 340/407.1, 441, 459
See application file for complete search history.

(56) References Cited

U.S. PATENT DOCUMENTS

| | | | | |
|---|---|---|---|---|
| 4,949,408 | A | 8/1990 | Trkla | |
| 5,033,000 | A | 7/1991 | Littlejohn | |
| 5,345,226 | A | 9/1994 | Rice | |
| 5,555,949 | A | 9/1996 | Stallard | |
| 5,794,730 | A | 8/1998 | Kamen | |
| 5,961,561 | A | 10/1999 | Wakefield | |
| 6,154,690 | A | 11/2000 | Coleman | |
| 6,222,282 | B1 | 4/2001 | Rossi | |
| 6,290,011 | B1 * | 9/2001 | Langaker et al. | 180/65.1 |
| 6,511,442 | B1 * | 1/2003 | Lathan et al. | 600/595 |
| 6,807,465 | B2 | 10/2004 | Ulrich | |
| 6,819,981 | B2 | 11/2004 | Wakefield | |
| 6,832,142 | B2 | 12/2004 | Busse | |
| 6,854,554 | B2 * | 2/2005 | Brandt et al. | 180/333 |
| 6,857,490 | B2 * | 2/2005 | Quigg | 180/9.28 |
| 6,989,642 | B2 * | 1/2006 | Wakefield et al. | 318/139 |
| 7,003,381 | B2 | 2/2006 | Wakefield, II | |
| 2005/0085962 | A1 | 4/2005 | Palmer et al. | |
| 2005/0113996 | A1 | 5/2005 | Pillar et al. | |

OTHER PUBLICATIONS

Sunrise Medical, Qickie SmartSeat, sunrisemedical.com, Dec. 2003, webpage.
Sunrise Medical, Qickie SmartSeat Manual, Dec. 2003, p. 1-23.
MC-2 Generic OEM Manual, Curtis Instruments AG, Sep. 13, 2000 through Oct. 19, 2001.

* cited by examiner

*Primary Examiner*—Dalena Tran
(74) *Attorney, Agent, or Firm*—MacMillan, Sobanski & Todd, LLC

(57) ABSTRACT

An electronic control system has the ability to programmably assign or map various input functions to different output functions. This allows for a much greater degree of customization of the control system for an individual user and allows inputs to be matched to different outputs to suit the individual users needs more optimally.

20 Claims, 8 Drawing Sheets

PERSONAL MOBILITY VEHICLE CONTROL SYSTEM WITH INPUT FUNCTIONS PROGRAMMABLY MAPPED TO OUTPUT FUNCTIONS

This application is a continuation of application Ser. No. 10/691,477, filed Oct. 22, 2003, issued as U.S. Pat. No. 7,113,854, on Sep. 26, 2006.

BACKGROUND OF INVENTION

This invention relates in general to motor vehicles and, more particularly, to control systems for motorized vehicles.

Electronic control systems for personal mobility vehicles, such as power wheelchairs, scooters, and the like, are well known. Such systems control the motion and behavior of the vehicle in response to command signals from a user. Generally, such systems control the function of drive wheels, which support the vehicle for movement on a supporting surface. In addition, various other functions are controlled by the control system, including the vehicle seat and light functions and accessory functions. These functions may also be controlled in response to command signals from the user.

Conventional electronic control systems require users to execute sequential input commands by depressing groupings of switches. Many wheelchair occupants are not able to execute sequential input commands. Ease of use of the electronic control system, especially reducing the number of switch command sequences required for activities of daily living, is a major issue in designing and applying an electronic control system to a wheelchair. Currently available electronic control systems generally do not facilitate ease of use because vehicle control is only possible by fixed switch command sequences.

What is needed is a control system that overcomes the foregoing deficiencies.

SUMMARY OF INVENTION

The present invention is directed toward an electronic control system that has the ability to programmably assign or map various input functions to different output functions. This allows for a much greater degree of customization of the control system for an individual user and allows inputs to be matched to different outputs to suit the individual user's needs more optimally. The invention is also directed toward a method for programmably mapping inputs to outputs.

Various objects and advantages of this invention will become apparent to those skilled in the art from the following detailed description of the preferred embodiment, when read in light of the accompanying drawings.

DETAILED DESCRIPTION

Figure 1:
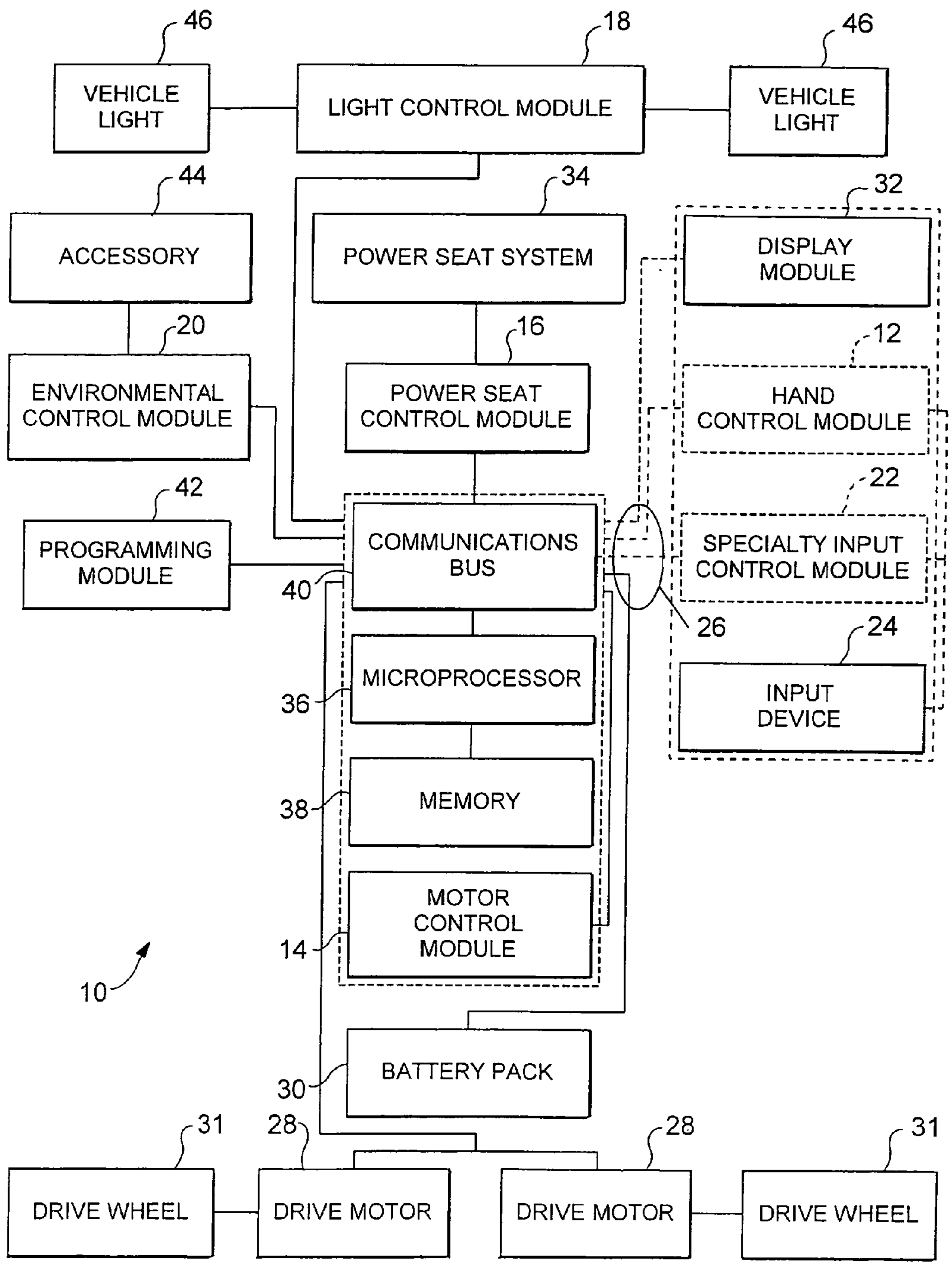
FIG. 1 is a diagrammatic representation of an electronic control system according to a preferred embodiment of the invention.

Referring now to the drawings, there is illustrated in FIG. 1 a diagrammatic representation of an electronic control system 10 for a personal mobility vehicle, such as power wheelchairs, scooters, and the like. The electronic control system 10 includes various modules, such as hand control modules 12, motor control modules 14, power seat control modules 16, light control modules 18, environmental control modules 20, specialty input control modules 22, and input devices 24, such as pneumatic input devices and groupings of switches designed for access by users with limited body control. The modules are connected together by electrical cables 26 that carry command signals from module to module within the electronic control system 10 and/or carry electronic power to the various parts of the electrical system of the vehicle.

The electronic control system 10 is adapted to be custom-configured by a healthcare professional for a specific user to match the user's physical and cognitive skills, and may not contain all the aforementioned modules, but only those modules needed by that specific user. For example, if the intended user is a spinal chord injury paraplegic with normal arm and hand function and normal cognitive skills, the electronic control system 10 might include only a hand control module 12, which may include a joystick and various switches, and a motor control module 14 to accept input signals from the hand control module 12, accept power from a battery pack 30, and output power to drive motors 28. These two modules 12, 14 may be connected by electrical cables 26 that carry command signals from the hand control module 12 to the motor control module 14 and carry electronic power to the various parts of the electrical system of the vehicle. The hand control module 12 could be physically positioned on the vehicle armrest, near the user's hand, and the motor control module 14 could be positioned underneath the seat (not shown) near the battery pack 30 and the drive motors 28 that drive the drive wheels 31.

The electronic control system 10 may include a programmable digital micro-controller or processor 36 and a memory 38 with imbedded software to programmably control the operation of the vehicle. Various modules of the electronic control system 10 may communicate with each other over a digital communications bus 40. The system communications bus 40 may also provide power to the various modules.

When the vehicle is initially set up for a given user, a programming module 42 may be connected to the electronic control system 10 to allow a technician to configure the software appropriately for that user, or to monitor the electronic control system 10 in use. Programming may include telling the electronic control system 10 what modules are connected (unless the electronic control system 10 is able to automatically detect the modules) and setting various parameters, such as the maximum speed or acceleration rate that would be appropriate for the specific user.

The various modules included in the electronic control system 10 are described in detail hereinbelow.

Input devices may be in the form of switched inputs or analog inputs. Switched inputs are on/off switches physically arranged in design to allow access by a disabled person with limited body function. Arrangements of one or more switches can be used to control movements of the vehicle and accessory functions, and can be placed on trays, on headrests, or other places (none of which are shown) reachable by disabled people. Switch closures by the user are interpreted into control commands by the electronic control system 10 based on the programming of the software and the operation of the input module. For example, a switch closure enables operation of the drive motors 28, another switch may control light functions. Analog inputs are proportional devices that are specially designed to allow access by disabled people. A commonly used example of an analog input device is a joystick (not shown). When the user pushes on the joystick in a certain direction, the vehicle will move in that direction and the more the joystick is displaced, the faster the vehicle will move. Another example of an analog device is a proportional devices, such as a head switch (not shown), which controls the speed of the vehicle based on the degree to which the switch is depressed by the user's head.

Input modules, such as the hand control module 12, may be used to accept signals from input devices, such as the input device 24, and send corresponding commands to the system communications bus 40. Some input modules, have built-in input devices, notably hand control modules 12 that have built in joysticks and switches.

Visual feedback or display modules 32 may be used to provide visual feedback to the user about the electronic control system 10. Display modules 32 may include text and/or iconic displays, such as liquid crystal displays, light emitting diodes, or similar lights, for showing the user what input device is active and the control mode of the control system. Display modules 32 may also allow the user to see what parameters are currently governing the electronic control system 10 and the state-of-charge of the battery. Display modules 32 may be stand-alone modules or modules that are built into input devices, such as the input device 24, or hand control modules, such as the hand control modules 12.

Motor control modules 14 may be provided for controlling the drive wheels 31 through the drive motors 28 and act as the hub of the electronic control system 10 as a whole. Motor control modules 14 may be housed in a separate enclosure with input and output connectors. Electronic cables 26 may be provided for connecting the motor control module 14 to the battery pack 30, the drive motors 28, the digital communications bus 40, and possibly other devices in the electronic control system 10, such as, speed encoders (not shown) on the drive motors 28. The motor control module 14 may interpret system commands from input devices into output commands to the drive motors 28, power seat control module 16, light control modules 18, environmental control modules 20, and other parts of the electronic control system 10.

Power seat control modules 16 may be used to control the position of the power seat system 34 on the vehicle, if present, so that the position of the vehicle occupant may be adjusted. Power seat systems 34 may use electric actuators to control the seat tilt, the backrest recline, the seat height, and the legrest angles, if the vehicle is equipped with these capabilities. The power seat control module 16 translates the user input signals into commands to the power seat system 34.

Light control modules 18 control lights 46 (i.e., headlights, turn indicators, and hazard lights) on the vehicle, if such lights are present. Input signals from the user are translated into light control commands by the light control module 18.

Environmental control modules 20 may be used to allow the user to control devices or accessories 44 external to the vehicle, for example, computers or room lights, via the input device of the electronic control system 10. The environmental control module 20 translates user inputs to control commands to operate the external device.

The programming module 42 may be provided to custom-configure the control software for a specific vehicle user to match the user's individual needs and capabilities. Many control system parameters may be set using the programming module 42, such as the maximum speed and acceleration rate.

Figure 2:
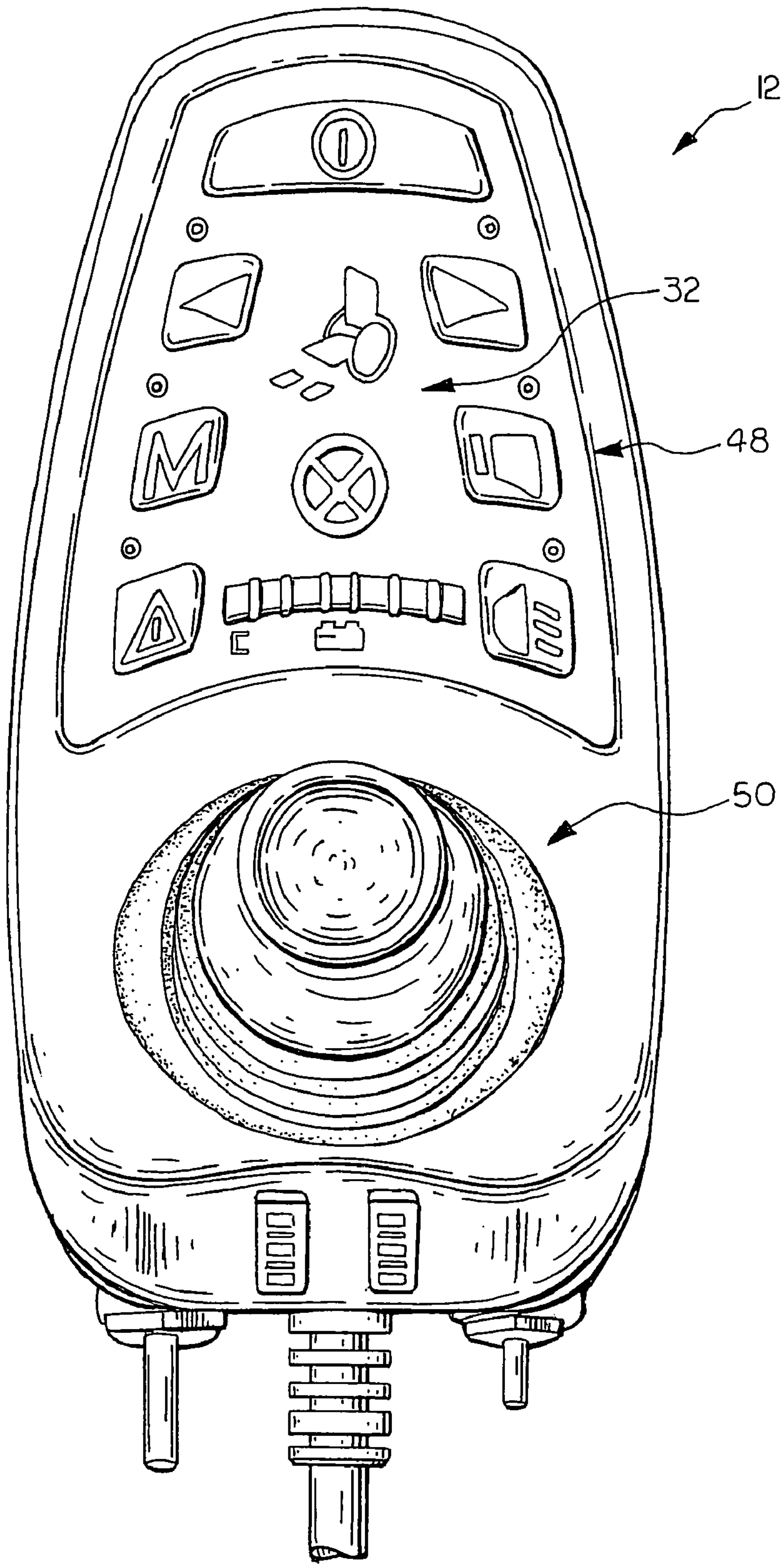
FIG. 2 is a schematic representation of a hand control module.

An example of a hand control module 12 according to one embodiment of the invention is illustrated in FIG. 2. The hand control module 12 includes various input devices and a display module 32. The input devices include various switched inputs 48 and an analog input 50. The switched inputs 48 include a plurality of switches and an analog input 50 is in the form of a joystick. The display module 32 also includes an iconic display for showing the user what input device 48, 50 is active and the control mode of the electronic control system 10.

In the illustrated hand control module 12, there are seven switches, although any suitable number of switches may be provided. The switches may communicate with the microcontroller or processor 36 through the communications bus 40. The microprocessor 36 programmably controls the operation of the vehicle according to the software imbedded in the memory 38.

The switched inputs 48 may carry indicia to aid the user in determining the operation associated with the switched inputs 48. For example, one switch may carry indicia that is standard for indicating power or "on/off". Other switches can carry indicia that are standards for indicating various vehicle light functions, such as headlights, turn indicators, and hazard lights. Another switch may carry indicia for indicating a horn. Yet another switch carries the abbreviated indicia, "M", for "Mode". These are only examples of indicia that the various switched inputs 48 may carry.

The display module 32 may include iconic displays, such as a visual graphic representing the vehicle, or a portion thereof, and a visual indicator for indicating drive and auxiliary control modes.

With the switched inputs 48 described above, the operation of the vehicle lights can be controlled simply by depressing a switch. For example, upon depressing the power switch, operation of the vehicle is enabled or disabled. By depressing any one of the light switches, operation of the lights is controlled. Similarly, by depressing the horn switch, the horn is actuated.

The aforementioned functions are all performed by the microprocessor 36 in accordance with the software embedded in the memory 38. That is say to, upon depressing a switched input 48, a signal is communicated to the microprocessor 36 through the communications bus 40. The microprocessor 36 performs a function associated with that signal as dictated by the software.

Figure 3A:
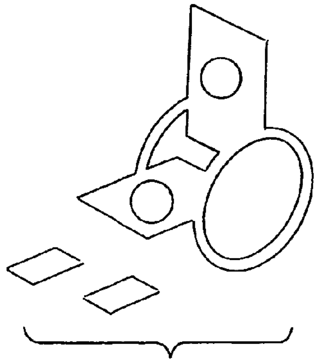
FIGS. 3A-3F is a diagrammatic representation of a display module.
Figure 3B:
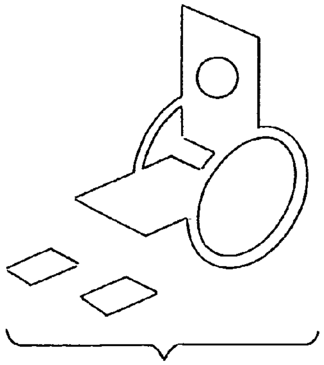
Figure 3C:
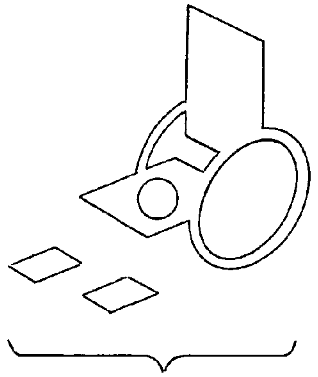
Figure 3D:
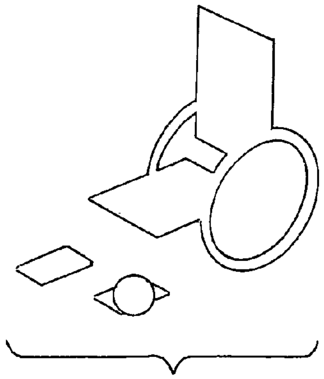
Figure 3E:
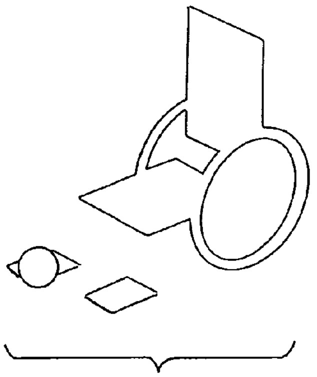
Figure 3F:
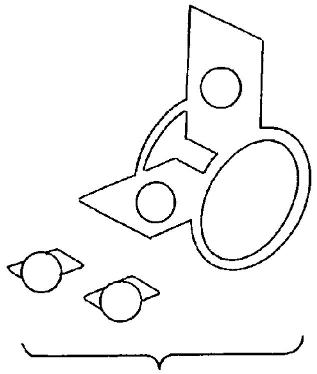
Figure 4B:
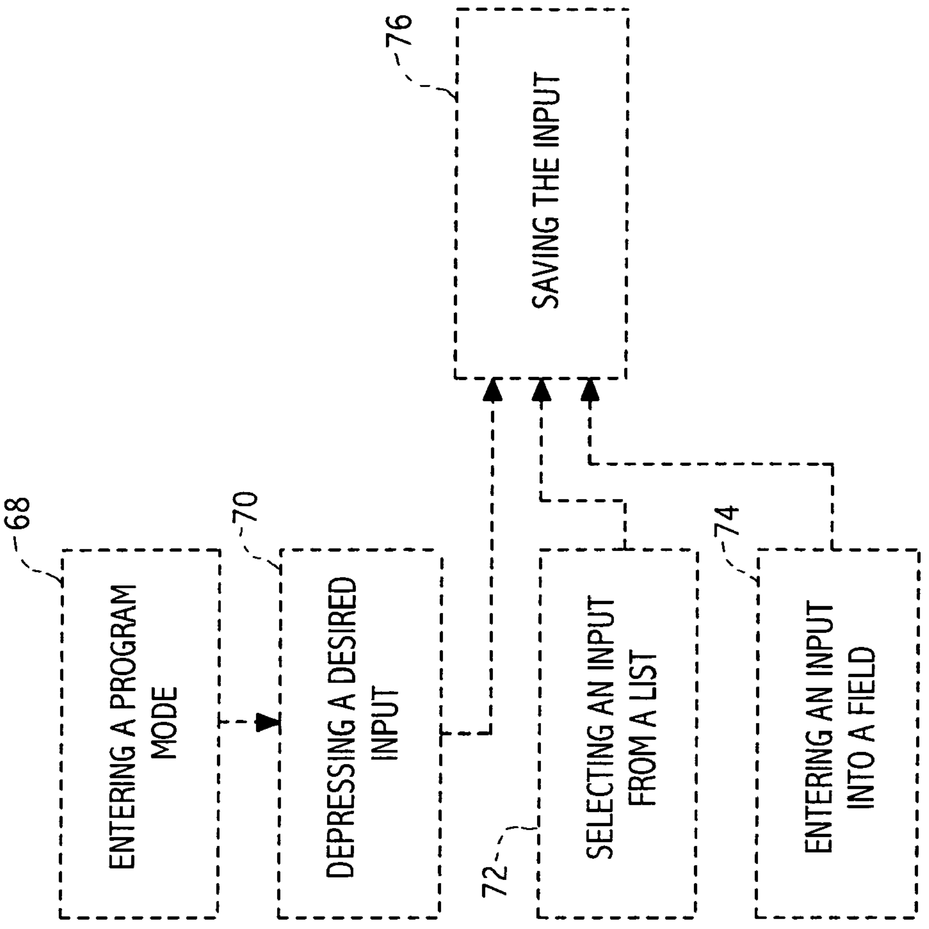
FIG. 4 is a flowchart depicting a method for mapping inputs to outputs.
Figure 4A:
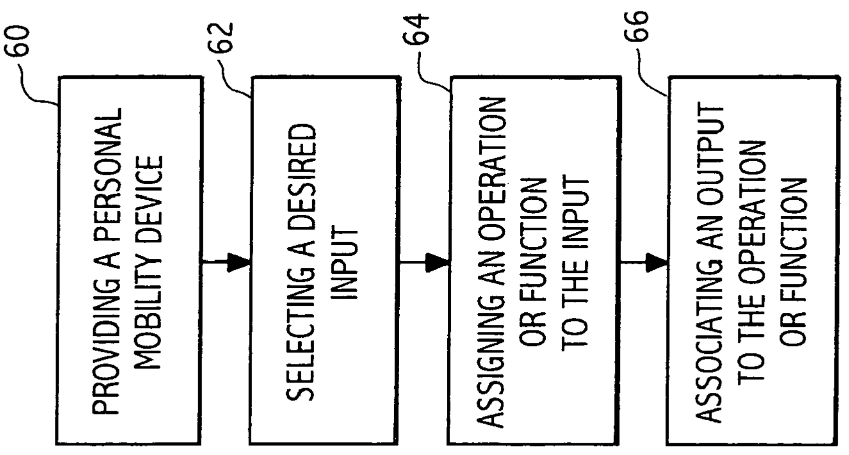
Figure 4C:
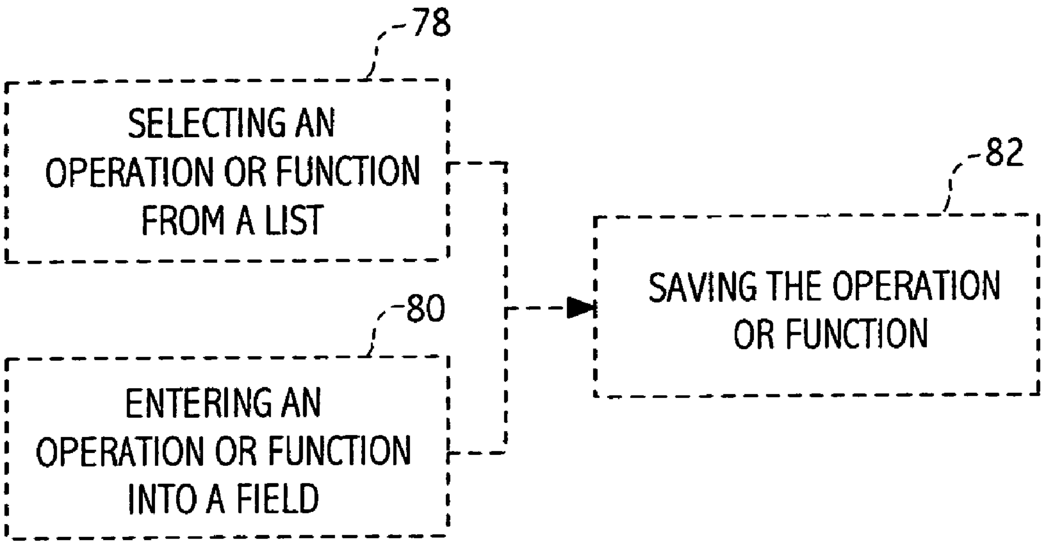
Figure 4D:
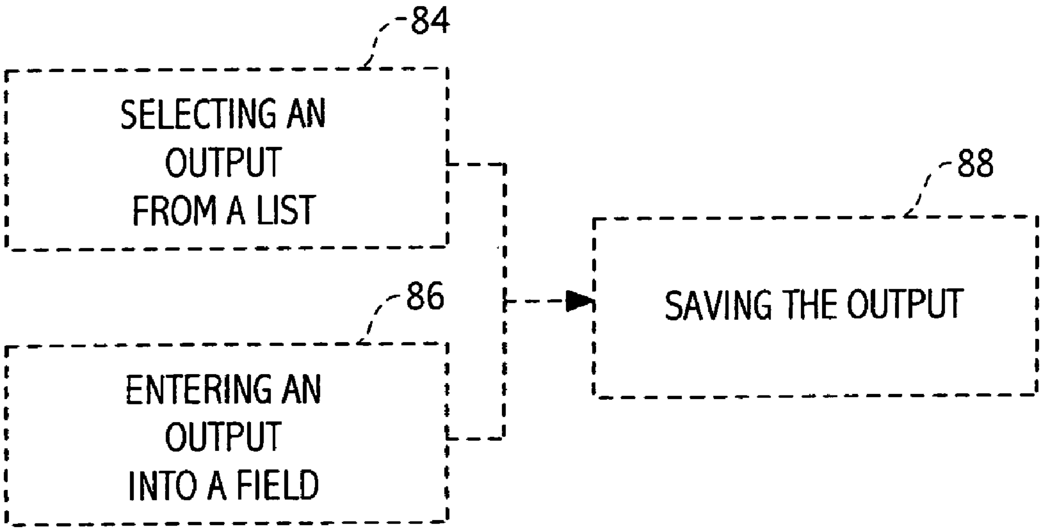
Figure 5A:
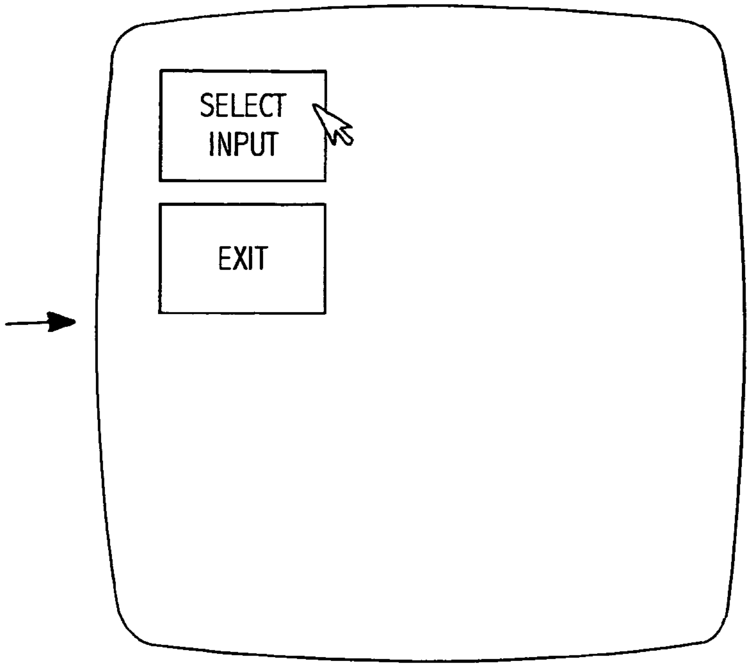
FIG. 5 is schematic representation of an application window of a program for use in mapping inputs to outputs.
Figure 5B:
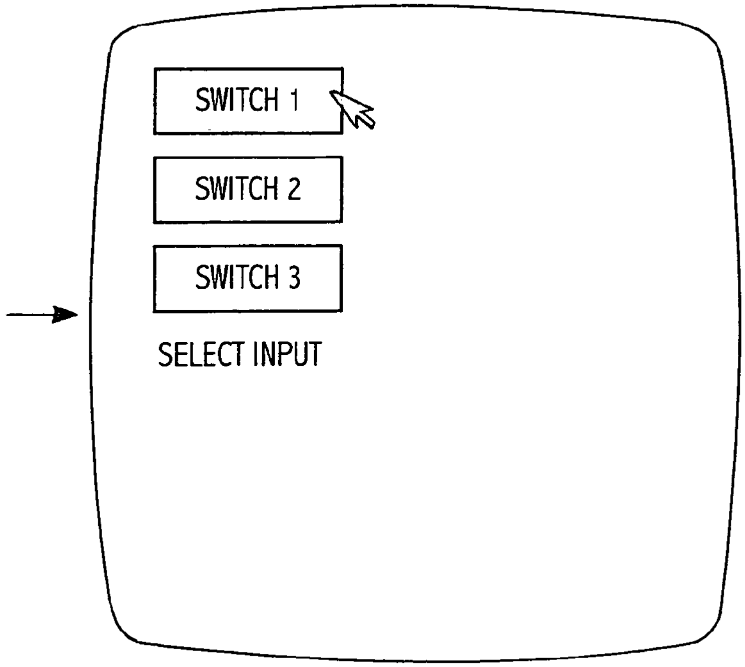
Figure 5C:
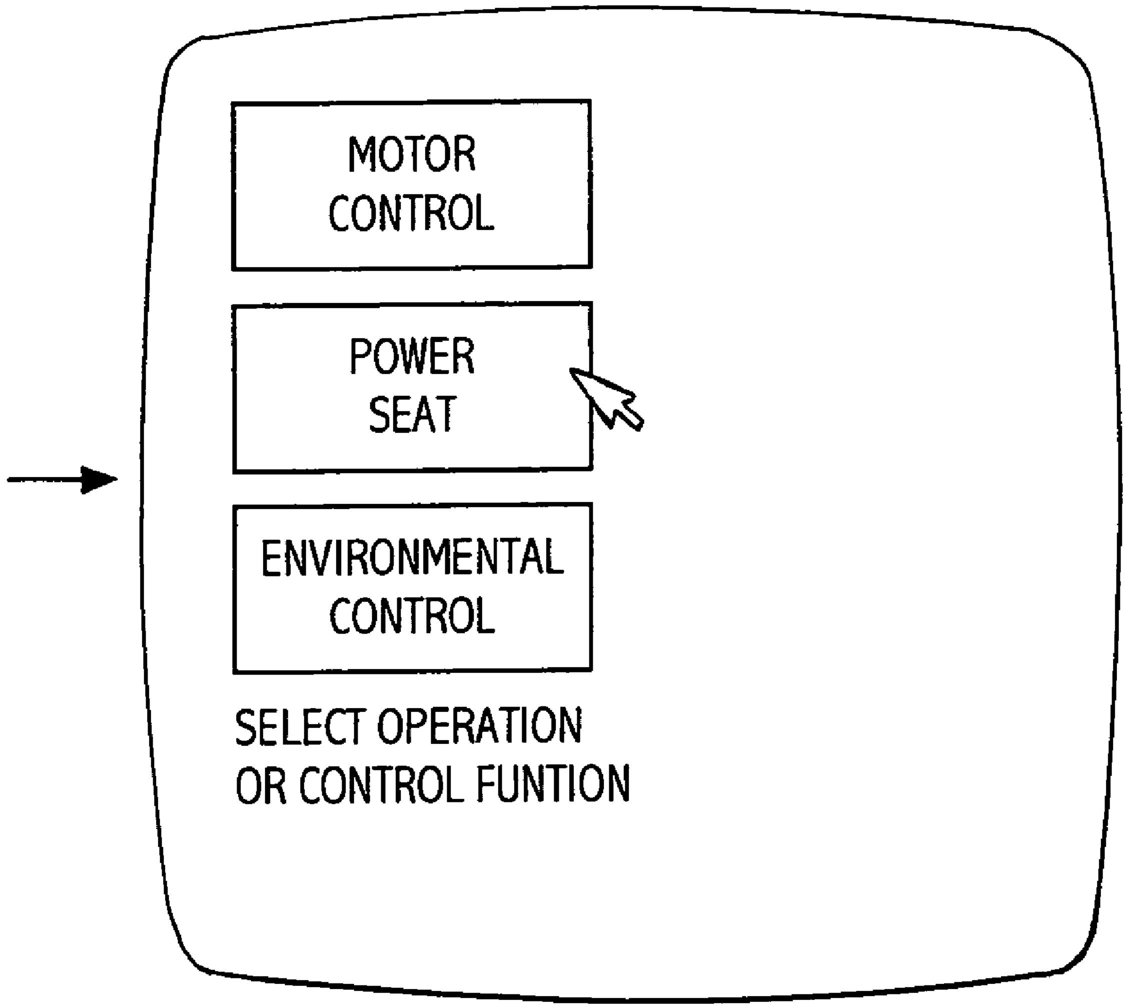
Figure 5D:
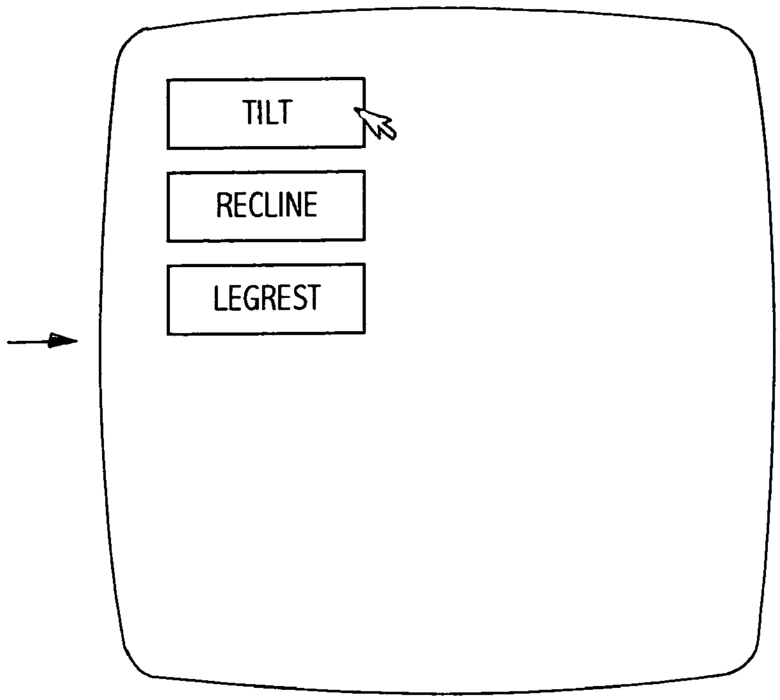
Figure 5E:
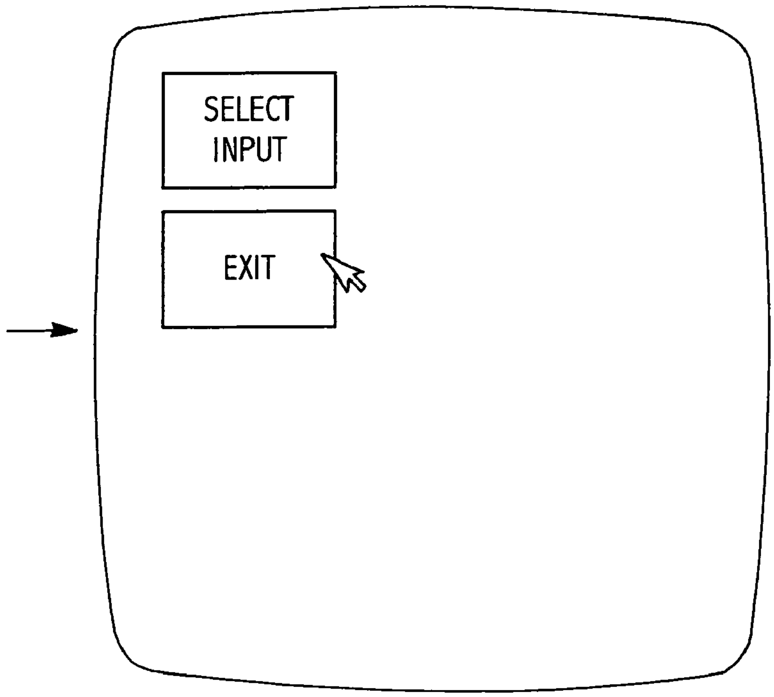

This holds true for the mode switch as well. However, the mode switch controls the operating mode of the vehicle. For example, when the power switch is depressed to enable operation of the vehicle, the vehicle initially enters drive mode, wherein the analog input 50 controls the operation of the drive motors 28 via the motor control module 14. Upon depressing the mode switch, the user can use the analog input 50 to navigate through the visual graphic of the vehicle to control other operations of the vehicle. The visual graphic can include indicators, which represent these operations. For example, indicators in the form of lights can represent power seat functions, such as tilt, recline, lift, and legrest functions, all of which are controlled by the power seat control module 16. The user can navigate to a desired light by moving the analog input 50 (i.e., the joystick) left and right, and can perform any function represented by the light by moving the analog input 50 forward and rearward. For instance, by navigating to the lights illustrated in FIG. 3A, and moving the analog input 50 forward and rearward, the vehicle seat can be tilted forward and rearward, respectively. By navigating to the light illustrated in FIG. 3B, and moving the analog input 50 forward and rearward, the vehicle seat back can be reclined forward and rearward. The vehicle seat can be raised and lower by navigating to the light illustrated in FIG. 3C and moving the analog input 50 forward and rearward. Legrests can similarly be adjusted by navigating to the lights in FIGS. 3D and 3E. A standing function can be performed by navigating to the lights in FIG. 3F.

Drive modes and auxiliary modes can be selected by navigating through the visual indicator, such as the pie graph shown. The visual indicator can be divided into a desired number of segments, each representing a drive or auxiliary control mode. Various drive modes can represent various drive profiles and auxiliary control modes can represent various accessory functions.

Users who rely on the personal mobility vehicle for mobility and accessory functions may be physically and/or cognitively disabled. The user's abilities and needs can depend on the user's diagnosis, age, medical history, and many other factors. Hence, the user may be highly capable cognitively but highly disabled physically, or highly disabled both physically and cognitively.

The electronic control system 10 according to the present invention has inputs that can be programmably mapped to outputs according to the needs of the user for convenient operation of the vehicle and the accessory functions. The electronic control system 10 is capable of reducing the number of sequences of input commands required to operate the vehicle and the accessory functions. Vehicle operations and accessory functions that are most often accessed by the user can be quickly selected. Consequently, users with limited physical ability can easily operate the vehicle and accessory functions with less fatigue than encountered by conventional control systems.

The present invention allows different input devices, such as but not limited to the switched inputs described above, to be programmably assigned to control various vehicle operations, such as operations of the power seat system 34, and accessory functions, such as computers or room lights. For example, switched inputs that are not frequently used, such as vehicle headlights, turn indicators, or hazard lights, can be programmably assigned to perform other vehicle operations or accessory functions. This avoids the need for the user to depress a mode switch and navigate through a display module 32 to enter, for example, the power seating mode. To this end, cognitive ability to enter the power seating mode is reduced because the user is no longer required to navigate through the visual graphic or indicator on the hand control module 12. With the electronic control system 10 of the present invention, the user, through the depression of a single switch, without need for visual feedback, can enter the power seating mode, or another vehicle operation mode, or perform an accessory function, that would otherwise require navigation through a display module 32.

In accordance with the present invention, the software embedded in the memory 38 comprises one or more programs, procedures, and/or routines associated with the operation of an electronic control system 10. A set of instructions directs the operation of the electronic control system 10 to perform each operation and accessory function that the vehicle is capable of performing. The software can be configured so that instructions can be associated with desired input devices (e.g., switched inputs) so that the microprocessor 36 can map the input devices to control a desired control module, such as the power seat control module 16 or the environmental control module 20. These modules 16, 20, in turn, control the operation of the vehicle seat (not shown) or accessories. This mapping can be accomplished in any known matter wherein a software profile is created for a particular user. The term "profile" in this context is understood to mean custom configure for the particular user. The software can be in any suitable software, and may include one or more objects, lookup tables, databases, and/or linked lists for performing the vehicle operations and accessory functions. The software may set up and initialize an array that could hold all instructions or data necessary to control the operation of the vehicle and accessory functions.

In accordance with the present invention, the microprocessor 36 can be programmed to access objects, jump to subroutines, or jump to locations in the table, database, or linked list associated with particular outputs upon selection of particular switched inputs. In this way, the electronic control system 10 can be customized so that operations and functions that the user desires, or most often uses, may be performed by depressing a switch that may otherwise be associated with outputs that perform operations or functions that the user may seldom use. Accordingly, the power seat control module 16 and/or the environmental control module 20 can be controlled by depressing a single switch.

It should be appreciated that the inputs can be mapped to outputs in any suitable manner. For example, the switch inputs 48 are user interface objects. The outputs are targets (e.g., control modules) to which the switch inputs 48 can send action messages. The action messages can represent operations (e.g., "TiltUp", "TiltDn", etc.) or control functions (e.g., "On", "Off", "VolUp", "VolDn", etc.). The input could send an action message to the target once if momentarily selected, or continuously as long as the button is depressed. The microprocessor 36 can be programmed so that a signal from a certain input could send a desired action message to a desired target. That is to say, the action message could be programmably assigned or otherwise associated with a desired input and the target to which the action message is to be sent could be customized for the user.

Inputs and outputs could be set up in a look up table with records including, for example, record identification fields, title fields, function-type fields, and detail fields. Each record identification field could include a record number. Each title field could provide titles for an operation or function associated with a corresponding record. Each function-type field could indicate the type of function associated with a corresponding record. The detail fields could indicate other record numbers and control modules affected by the operations and functions, pins thereof, and signals applied thereto, and values for parameters. Parameters may be variable settings that the vehicle software uses to affect the way the vehicle drives and operates.

An array may include variables, such as action and value variables. The action variable could specify the action mode and/or control function that would be activated upon depressing a switch. When the user depresses the switch, control could be passed to a command parser. The command parser could compare the value held in the action variable to a list of possible actions. Upon finding a match, the command parser could send control to the appropriate output (e.g., control module) in the program, which would complete the referenced action (i.e., enter the selected control mode and perform the associated operation or function).

The value variable could hold a value, if desired. As an example, if the action variable controls a drive profile (e.g., the maximum speed) of the vehicle, the value variable could hold the desired setting for that speed. In this way, the user could easily set the maximum speed to, for example, 70 percent. The value variable could also be a relative setting. For example, if the value variable is +10, the maximum speed could be incremented by 10 percent.

The software could control the operation of each switch. For example, the microprocessor could be programmed to interpret a switch depression as a momentary, pulse, on/off, or toggle operation. A momentary switch operation could relay an output as long as the switch is depressed. A pulse switch operation could relay an output for a specific period of time when the switch is depressed. An on/off switch operation could open or close each time the switch is depressed. A toggle switch operation could change the current state of the output (i.e., if the output is on, the output will be turned off).

A method for mapping inputs to the outputs is shown in FIG. 4. According to this method, a personal mobility vehicle is provided having inputs, outputs, and a programmable micro-controller or processor for performing vehicle operations or control functions of the outputs in response to signals from the inputs, as shown in function step 60. In function step 62, a desired input is selected. After the desired input is selected, an operation or control function is assigned to the input, as shown in function step 64. Then, an output is associated with the operation or control function, as shown in function step 66. It should be appreciated that function steps 62-66 can be performed in any order and need not be performed in the order described above. In addition, it should be appreciated that any or all of the function steps 62-66 could be combined as opposed to being performed separately.

It should be understood that an input to be mapped may be selected in any suitable manner. For example, an input may be selected by entering a programming mode, as shown in function step 68, and then depressing the desired input, as shown in function step 70. Alternatively, the input may be selected from a list of inputs, as shown in optional function step 72, or by manually entering an input, for example, into a field through the use of a terminal, as shown in optional function step 74. Once the input is selected, the input may be saved, as shown in optional function step 76. Other input may be selected in a similar manner.

Operation or control functions may be assigned to the input in any suitable manner. For example, operations or control functions may be selected from a list of operations or control functions, as shown in function step 78, or be manually entered, for example, into a field through a terminal, as shown in alternative functional step 80. Operations or control functions may include, for example, action messages (e.g., TiltUp, TiltDn, Fwd, Back, On, Off, VolUp, VolDn, etc.) and parameter values. Once operations or control functions are assigned to desired inputs, the operations or control functions may be saved, as shown in optional function step 82.

The output may be associated with a desired input in any suitable manner. For example, outputs may be selected from a list of outputs, as shown in function step 84, or be manually entered, for example, into a field through a terminal, as shown in alternative functional step 86. Outputs may include, for example, motor control modules, power seat control modules, or accessory control modules, which in turn control drive motors, power seat system actuators, or accessories (e.g., television, room lights, doors). Once the output is associated with a desired input, the output may be saved, as shown in optional function step 88.

The foregoing method can be performed in any suitable manner. For example, the method may be performed using a program editor. The program editor can include any suitable program or software application. The application may be integral with the vehicle. Alternatively, the application can be stored in an external device, such as the programming module 42 described above. The programming module 42 can be removably connected or linked to the vehicle in any suitable manner, such as through a physical connector or a wireless connection, and may be in the form of a handheld pendant or palm, or a personal computer.

The program editor may be in the form of a user-friendly windows application. An example of an application window for mapping inputs to outputs is shown in FIG. 5. The window may contain step-by-step instructions for selecting an input and assigning operations or control functions to the input. Inputs may be selected by for example, selecting a "Input Editor" button, and then manually entering inputs into fields, for example, via a terminal or selecting inputs from a list of inputs (e.g., switch 1, switch 2, etc.). The latter can be accomplished with a terminal or a mouse, wherein an input is selected from a list by clicking on an input in a list, or by dragging and dropping an input from a list into a field or other designated location. As yet another alternative, an arrangement or array of inputs may be provided in the window, as shown, and an input may be selected by clicking on the input with a mouse or other peripheral device.

Once an input is selected, an operation or control function may be assigned to the input. This may be accomplished, for example, by manually entering operations or control functions into fields, for example, via a terminal. Alternatively, operations or control functions could be selected from a list (e.g., TiltUp, TiltDn, Fwd, Back, On, Off, VolUp, VolDn, Param, etc.). This could be accomplished, for example, by clicking an operation or control function that is to be assigned to the selected input. Alternatively, operations and control functions may be selected from a list by dragging and dropping an operation or control function from the list into a field or other designated location.

Once operations or control functions are assigned to the input, the operations or control functions may be saved simply by clicking a button in the window, such as "Save Function". Inputs that have not been assigned an operation or control function can be emphasized, pronounced, or highlighted in some manner, such as by allowing those inputs to appear in red font so that those inputs can be easily identified.

Now, output may be associated with the operation or control function. This may be accomplished in any suitable manner. For example, similar to the selection of an input or an operation or control function, an output may be selected by manually entering the output into a field, for example, via a terminal. Alternatively, an output could be selected from a list (e.g., motor control module, power seat control module, environmental control module, etc.). This could be accomplished, for example, by clicking an output that is to be associated with the operation or control function. Alternatively, outputs may be selected from a list of outputs by dragging and dropping an output from the list into a field or other designated location.

It should be appreciated that the selection of operations and control functions and the selection of output may be accomplished through a single selection, and then save accordingly by clicking on a button, such as a "Finished" button.

The inputs may be changed at any time. This can be accomplished with the program editor simply by selecting the "Edit Input" button in the program editor and following the instructions.

It should be understood that the invention is not intended to be limited to the application shown and described above and that other applications may be suitable for carrying out the invention. For example, outputs having pre-associated functions that may be selected from a list.

It should also be understood that a program editor application may be integral with the personal mobility vehicle, as opposed to being removably linked to the personal mobility vehicle. The operation of such a program editor may be viewed on the vehicle display module 32 and controlled via the hand control module 12. For example, the hand control module 12 may be provided with a "Program" button that can be selected to map inputs to outputs. Upon selecting this button, an input may be depressed. Subsequently, the user may be prompted to select an operation or control function to be performed by the input and an output to which the input is to be mapped. Alternatively, a user may navigate to a desired operation or control function and then select the "Program" button and a desired input to map that input to the desired operation or control function.

It should further be understood that the menu structure need not be created by an application but rather may be created by someone skilled in writing and editing menu structure software or algorithms.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A personal mobility vehicle electronic control system comprising:

a plurality of inputs; and at least two outputs, the control system being configured so that one of the plurality of inputs is programmably mapped to one of the outputs so that mapping of the input to control one of the outputs can be changed to control a different output, the control system further configured to recall the changed mapping of the input to the different output.

2. The electronic control system of claim 1, in combination with a wheelchair, the wheelchair comprising:

one or more drive wheels supporting the wheelchair for movement in relation to a supporting surface; and a seat supported in relation to the one or more drive wheels.

3. The electronic control system of claim 1 wherein a microprocessor is in communication with the at least one input and the at least two outputs, the microprocessor being programmable to map a signal from the at least one input to one of the at least two outputs according to a user's preferences.

4. The electronic control system of claim 3 wherein the microprocessor is programmable for controlling one of the at least two outputs in accordance with a signal from the input, and wherein the input is a switched input on a hand control module of the personal mobility vehicle.

5. The electronic control system of claim 4 wherein one of the outputs is a motor control module and the microprocessor controls a parameter of the motor control module in accordance with the input signal from the switched input.

6. The electronic control system of claim 4 wherein the microprocessor is programmable to cause the switched input to act as either a latched input or an unlatched input.

7. The electronic control system of claim 3 wherein the microprocessor includes a memory with software embedded in the memory for controlling the microprocessor, the software being configured so that the microprocessor can map the input to control one of the at least two outputs.

8. The electronic control system of claim 3 wherein the microprocessor includes a memory with imbedded software to programmably control the operation of the vehicle.

9. The electronic control system of claim 8 wherein a software profile is created for a particular user.

10. The electronic control system of claim 1 wherein one of the outputs is a power seat module.

11. The electronic control system of claim 1 wherein one of the outputs is an environmental control module.

12. The electronic control system of claim 1 wherein one of the outputs controls an accessory function.

13. The electronic control system of claim 1 wherein the at least one input is a plurality of switched inputs and the at least two outputs are a plurality of outputs, the control system being configured so that different switched inputs are programmably assigned to control different outputs.

14. The electronic control system of claim 13 wherein at least one of the plurality of outputs controls the operation of a power seat system of the personal mobility vehicle.

15. The electronic control system of claim 13 wherein the plurality of outputs are operative to control a plurality of output devices and wherein the plurality of output devices include a motor control module and at least one of a power seat control module, a light control module, and an environmental control module.

16. The electronic control system of claim 15 wherein a digital communications bus is connected between a hand control module and the plurality of output devices.

17. The electronic control system of claim 15 wherein a digital communications bus provides communication between the at least two of the output devices.

18. The electronic control system of claim 1 wherein the at least one input is a hand control module.

19. The electronic control system of claim 18 wherein the hand control module includes a joystick and at least one switch.

20. The electronic control system of claim 1 wherein a display module is in communication with the at least one input.

* * * * *